(12) United States Patent  
Miller et al.

(10) Patent No.: US 9,256,357 B2
(45) Date of Patent: Feb. 9, 2016

(54) PROVISIONING A PORTLET VIEWER FOR VIEWING DRAG-AND-DROP CONTENT IN A PORTAL ENVIRONMENT

(71) Applicant: INTERNATIONAL BUSINESS MACHINES CORPORATION, Armonk, NY (US)

(72) Inventors: Steven M. Miller, Cary, NC (US); Faisal M. Rajib, East Elmhurst, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 249 days.

(21) Appl. No.: 13/968,826

(22) Filed: Aug. 16, 2013

(65) Prior Publication Data

US 2013/0339887 A1   Dec. 19, 2013

Related U.S. Application Data

(63) Continuation of application No. 11/233,883, filed on Sep. 23, 2005, now Pat. No. 8,560,953.

(51) Int. Cl.
*G06F 3/0486* (2013.01)
*G06F 17/30* (2006.01)

(52) U.S. Cl.
CPC .......... *G06F 3/0486* (2013.01); *G06F 17/3089* (2013.01)

(58) Field of Classification Search
CPC .................................................... G06F 3/0486
USPC ................... 715/769, 770, 742, 744
See application file for complete search history.

(56) References Cited

U.S. PATENT DOCUMENTS 5,363,482 A * 11/1994 Victor ................... G06F 3/0481
                                                                715/201
5,875,322 A   2/1999 House et al.
(Continued)

FOREIGN PATENT DOCUMENTS

CN      101258466 A     9/2008
EP        1934718 A1    6/2008
(Continued)

OTHER PUBLICATIONS

WIPO Appln. PCT/EP2006/066630, International Search Report, Feb. 2, 2007, 2 pg.
(Continued)

*Primary Examiner* — Daeho Song
(74) *Attorney, Agent, or Firm* — Cuenot, Forsythe & Kim, LLC

(57) ABSTRACT

Embodiments of the present invention address deficiencies of the art in respect to drag-and-drop operations for content in a portal view and provide a method, system and computer program product for provisioning a portlet viewer for viewing drag-and-drop content in a portal environment. In one embodiment, a computer-implemented method for provisioning a portlet viewer for viewing drag-and-drop content in a portal page can include determining a content type for content selected externally to the portal page subsequent to rendering the portal page, locating a portlet viewer associated with the determined content type, provisioning the located portlet viewer in the portal page, and rendering the provisioned portlet viewer in the portal page with the content.

18 Claims, 3 Drawing Sheets

(56) References Cited

U.S. PATENT DOCUMENTS

| | | | |
|---|---|---|---|
| 5,897,650 A | 4/1999 | Nakajima et al. | |
| 6,549,218 B1 | 4/2003 | Gershony et al. | |
| 6,725,425 B1* | 4/2004 | Rajan | G06F 17/30864 |
| | | | 707/E17.109 |
| 6,871,197 B1* | 3/2005 | Johnson | G06F 17/3089 |
| | | | 706/12 |
| 8,407,309 B1* | 3/2013 | Feldman | G06F 8/20 |
| | | | 707/999.01 |
| 8,560,953 B2 | 10/2013 | Miller et al. | |
| 2001/0028369 A1 | 10/2001 | Gallo et al. | |
| 2002/0109725 A1 | 8/2002 | Suzuki et al. | |
| 2003/0101412 A1* | 5/2003 | Eid | G06F 17/30893 |
| | | | 715/234 |
| 2003/0167315 A1* | 9/2003 | Chowdhry et al. | 709/218 |
| 2003/0187956 A1* | 10/2003 | Belt | H04L 67/2823 |
| | | | 709/219 |
| 2004/0003097 A1* | 1/2004 | Willis | G06F 17/30873 |
| | | | 709/228 |
| 2004/0010755 A1 | 1/2004 | Hamada | |
| 2004/0100501 A1* | 5/2004 | Dornback | 345/769 |
| 2004/0107175 A1 | 6/2004 | Hung et al. | |
| 2004/0111467 A1* | 6/2004 | Willis | G06F 17/30702 |
| | | | 709/203 |
| 2004/0123238 A1 | 6/2004 | Hefetz et al. | |
| 2004/0128620 A1 | 7/2004 | Lund | |
| 2004/0183831 A1* | 9/2004 | Ritchy et al. | 345/762 |
| 2004/0230947 A1* | 11/2004 | Bales et al. | 717/110 |
| 2004/0243577 A1 | 12/2004 | Choudhary et al. | |
| 2006/0004913 A1 | 1/2006 | Chong | |
| 2006/0010390 A1* | 1/2006 | Guido | G06F 17/30873 |
| | | | 715/742 |
| 2006/0143308 A1* | 6/2006 | Cazzolla | H04L 63/08 |
| | | | 709/203 |
| 2006/0155682 A1 | 7/2006 | Lection et al. | |
| 2006/0212798 A1 | 9/2006 | Lection et al. | |
| 2006/0212822 A1* | 9/2006 | Facemire | G06F 17/241 |
| | | | 715/769 |
| 2007/0006088 A1* | 1/2007 | Bales | G06F 17/30873 |
| | | | 715/769 |
| 2007/0006089 A1* | 1/2007 | Bales | G06F 9/50 |
| | | | 715/769 |
| 2007/0073701 A1 | 3/2007 | Miller et al. | |

FOREIGN PATENT DOCUMENTS

| | | |
|---|---|---|
| JP | 2004046357 A | 2/2004 |
| JP | 2009515235 A | 4/2009 |
| JP | 4988746 B2 | 8/2012 |
| TW | I238336 B | 8/2005 |
| TW | I409647 B | 9/2013 |
| WO | 2007039491 A1 | 4/2007 |

OTHER PUBLICATIONS

WIPO Appln. PCT/EP2006/066630, International Preliminary Report on Patentability and Written Opinion, Mar. 26, 2008, 8 pg.
U.S. Appl. No. 11/233,883, Non-Final Office Action, Jan. 23, 2008, 10 pg.
U.S. Appl. No. 11/233,883, Final Office Action, Jul. 8, 2008, 8 pg.
U.S. Appl. No. 11/233,883, Appeal Brief, Dec. 8, 2008, 15 pg.
U.S. Appl. No. 11/233,883, Examiner's Answer, Jun. 24, 2009, 10 pg.
U.S. Appl. No. 11/233,883, Reply brief, Aug. 24, 2009, 11 pg.
U.S. Appl. No. 11/233,883, Final Office Action, Nov. 3, 2009, 9 pg.
U.S. Appl. No. 11/233,883, Appeal Brief, Feb. 3, 2010, 16 pg.
U.S. Appl. No. 11/233,883, Examiner's Answer, Apr. 27, 2010, 14 pg.
U.S. Appl. No. 11/233,883, Reply brief, Jun. 28, 2010, 11 pg.
U.S. Appl. No. 11/233,883, Patent Board Decision, Mar. 27, 2013, 5 pg.
U.S. Appl. No. 11/233,883, Notice of allowance, Jun. 11, 2013, 6 pg.

* cited by examiner

PROVISIONING A PORTLET VIEWER FOR VIEWING DRAG-AND-DROP CONTENT IN A PORTAL ENVIRONMENT

CROSS-REFERENCE TO RELATED APPLICATIONS

This application is a Continuation of U.S. application Ser. No. 11/233,883, filed on Sep. 23, 2005.

BACKGROUND OF THE INVENTION

1. Field of the Invention

The present invention relates to the field of portal environment management and more particularly to the field of viewing content in a portlet within a portal environment.

2. Description of the Related Art

Distributing content about large computer communications networks is not without its challenges. In particular, the quantity of content available for distribution in a computer communications network often varies proportionally to the size of the computer communications network. At the extreme, the Internet hosts a vast quantity of content not easily accessible by most end-users. Portals represent a sensible solution to the problem of aggregating content through a channel paradigm in a single, network-addressable location. In consequence, portals have become the rage in content distribution.

Portlets are the visible active components included as part of portal pages. Similar to the graphical windows paradigm of windowing operating systems, each portlet in a portal occupies a portion of the portal page through which the portlet can display associated content from a portlet channel. Portlets are known to include both simple applications such as an electronic mail client, and also more complex applications such as forecasting output from a customer relationship management system. The prototypical portlet can be implemented as server-side scripts executed through a portal server.

From the end-user perspective, a portlet is a content channel or application to which the end-user can subscribe. By comparison, from the perspective of the content provider, a portlet is a means through which content can be distributed in a personalized manner to a subscribing end-user. Finally, from the point of view of the portal, a portlet merely is a component which can be rendered within the portal page. In any case, by providing one or more individually selectable and configurable portlets in a portal, portal providers can distribute content and applications through a unified interface in a personalized manner according to the preferences of the end-user.

Portal servers are computer programs which facilitate the distribution of portal based Web sites on the public Internet or a private intranet. Importantly, it will be recognized by one of ordinary skill in the art that the signature characteristic of all conventional portal servers can include the aggregation of content from several portlet applications within a single distributable page in a uniform manner. To that end, each portlet application within the portal page can be represented by a portlet user interface distributed by the portal server to requesting client computing devices.

In a portal environment, it is a common operation for a user to customize a portal view by adding content to the portal view. In many cases, the content to be added is basic content that has been obtained from another application or location by way of a cut-and-paste or drag-and-drop operation. Basic content often includes copied text, graphics or image content, entire documents, spreadsheets, streaming data sources, Weblogs, RSS or syndicated content feeds, or other reference objects like a uniform resource locator (URL). In order to add basic content to a portal view, the portal view already must include a corresponding viewer—typically a portlet application configured for rendering the pertinent basic content. If the portal view does not already include a corresponding viewer, a configuration mode must be utilized through which a corresponding viewer can be selected for addition to the portal page.

United States Patent Application Publication No. US 2004/0123238 A1 to Hefetz et al. for SELECTIVELY INTERPRETED PORTAL PAGE LAYOUT TEMPLATE (hereinafter, "Hefetz"), partially addresses the accommodation of a drag-and-drop operation for adding content to a portal page in a portal environment. In Hefetz, during the design phase of a portal page, a placeholder in a portal template can be translated into a representation of a container designed to present portal content. Subsequently, during run-time, dynamic content can be received from a dynamic content source and the placeholder in the portal template can be translated into a presentation of the container containing portal dynamic content components.

Notwithstanding the solution proposed by Hefetz, in order to accommodate a drag-and-drop operation for basic content, the portal page must be pre-configured at design-time with a placeholder for a container able to render the basic content provided in a drag-and-drop operation at run-time. The use of a placeholder in the absence of a drag-and-drop operation can be inefficient and can needlessly consume real estate in the portal view. Moreover, to properly pre-configure the placeholder, some a priori knowledge of the content to be added to the portal view must exist.

BRIEF SUMMARY OF THE INVENTION

Embodiments of the present invention address deficiencies of the art in respect to drag-and-drop operations for content in a portal view and provide a novel and non-obvious method, system and computer program product for provisioning a portlet viewer for viewing drag-and-drop content in a portal environment. In one embodiment, a computer-implemented method for provisioning a portlet viewer for viewing drag-and-drop content in a portal page can include determining a content type for content selected externally to the portal page subsequent to rendering the portal page, locating a portlet viewer associated with the determined content type, provisioning the located portlet viewer in the portal page, and rendering the provisioned portlet viewer in the portal page with the content.

In one aspect of the embodiment, determining a content type for content selected externally to the portal page subsequent to rendering the portal page can include detecting a drop event for a drag and drop operation for content selected externally to the portal page, and determining a content type for the content. In another aspect of the embodiment, determining a content type for content selected externally to the portal page subsequent to rendering the portal page can include detecting a paste event for a cut and paste operation for content selected externally to the portal page and determining a content type for the content.

In either case, the method further can include identifying a designated portion of the portal page for receiving the content. Consequently, provisioning the located portlet viewer in the portal page can include provisioning the located portlet viewer in the designated portion of the portal page for receiving the content. Finally, provisioning the located portlet viewer in the portal page identifying an existing instance of the located portlet viewer in the portal page, and configuring the existing instance of the located portlet viewer to receive the content.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for provisioning a portlet viewer for viewing drag-and-drop content in a portal page]. In accordance with an embodiment of the present invention, content from an application external to a portal page can be copied and an available portion of the portal page can be designated to receive the copied content. The content can be analyzed to determine a content type and a corresponding portlet viewer can be selected to render the content in the portal page. Subsequently, the portlet viewer can be provisioned for placement in the available portion of the portal page. Alternatively, an existing instance of the portlet viewer in the portal page can be selected to render the content.

Figure 1:
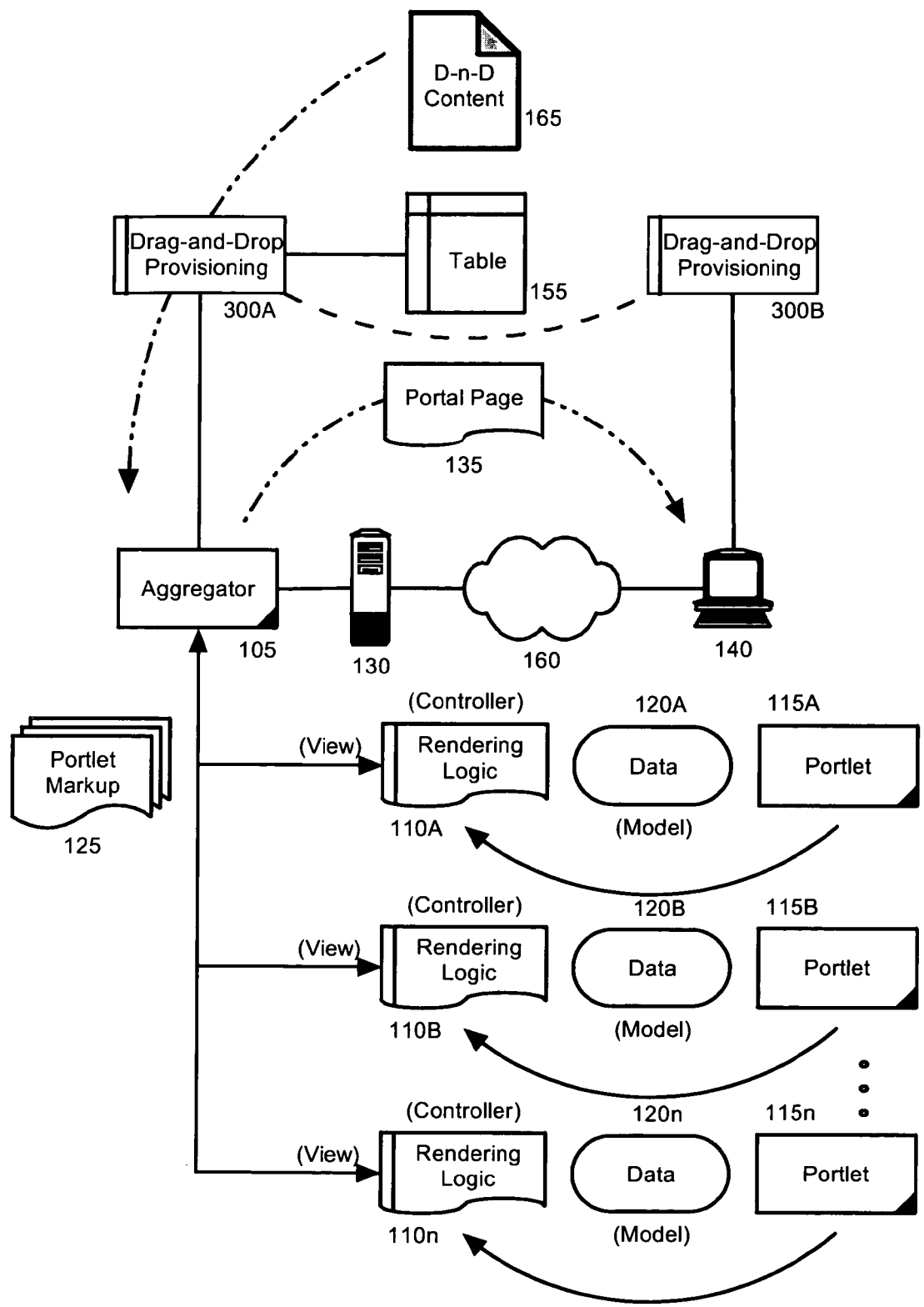
FIG. 1 is a schematic illustration of a portal data processing system configured for provisioning a portlet viewer for viewing drag-and-drop content in a portal page.

In further illustration, FIG. 1 is a schematic illustration of an exemplary portal data processing system configured for provisioning a portlet viewer for viewing drag-and-drop content in a portal page The portal data processing system can include a portal page 135 communicatively coupled to a selection of portlet applications 115A, 115B, 115n through a portal server 130. Each portlet application 115A, 115B, 115n can produce a view based upon portlet data 120A, 120B, 120n in the form of portlet markup 125 through corresponding rendering logic 110A, 110B, 110n. Notably, the rendering logic 110A, 110B, 110n can be active markup such as a Java Server Page (JSP), Active Server Page (ASP), or other dynamic script, in which logical scriptlets can be embedded to produce specific markup language tags.

A portlet aggregator 105 can be coupled to each portlet application 115A, 115B, 115n to receive the portlet markup 125 and to aggregate the portlet markup 125 into view in the portal page 135. By aggregation, it is meant that the individual markup language blocks produced by each portlet 115A, 115B, 115n can be combined into a single cohesive markup language document configured for distribution to and use within a conventional content browser. In this regard, the portal page 135 can be disposed in the portal server 130 from which the portal 135 can be accessed by client content browsing devices 140 over a computer communications network 160 such as a local computer communications network, for instance a private intranet, or a global computer communications network, for instance the public Internet.

Notably, drag-and-drop provisioning logic 300B is an active client-side component that can be coupled to a server-side drag-and-drop provisioning logic 300B over the computer communications network 160. The drag-and-drop provisioning logic 300B can be configured to detect a request to copy selected content 165 from an application which is external to the portal page 135 into a designated portion of the portal page 135 such as a vacant portion not already occupied by an instance of the portlets 115A, 115B, 115n. Responsive to detecting the request, the drag-and-drop provisioning logic 300B can notify drag-and-drop provisioning logic 300A.

The drag-and-drop provisioning logic 300A in turn can be configured to locate a content type for the content within a table 155. Based upon the content type, the drag-and-drop provisioning logic 300A can select a particular one of the portlets 115A, 115B, 115n associated with the content type for provisioning into the designated portion of the portal page 135. Subsequently, the portal page 135 can be rendered with the provisioned instances of the portlets 115A, 115B, 115n including one of the portlets 115A, 115B, 115n in which the content 165 has been rendered.

Figure 2A:
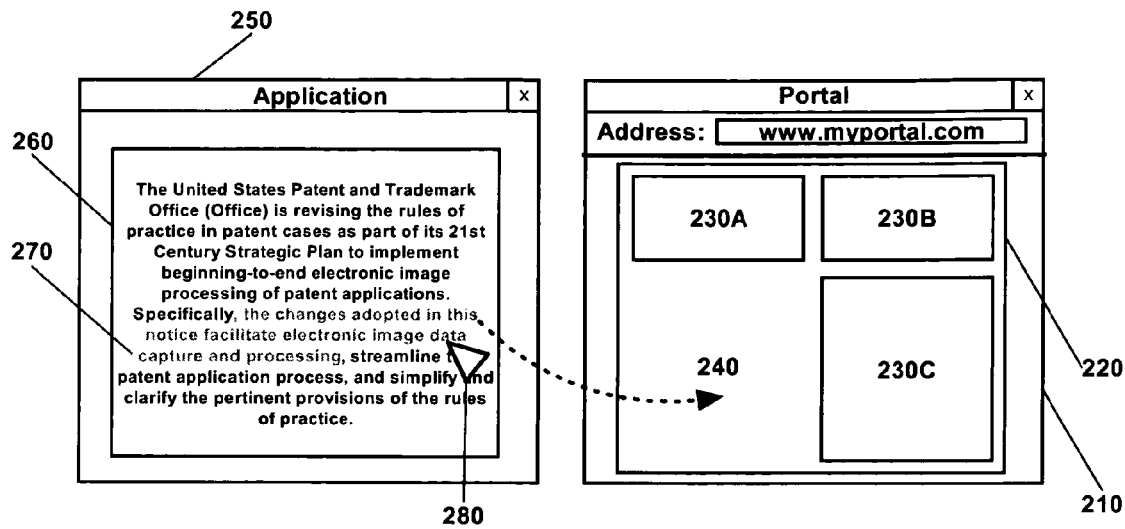
FIGS. 2A and 2B, taken together, are a pictorial illustration of a portal data processing system configured for provisioning a portlet viewer for viewing drag-and-drop content in a portal page; and, FIG. 3 is a flow chart illustrating a process for provisioning a portlet viewer for viewing drag-and-drop content in a portal page.
Figure 2B:
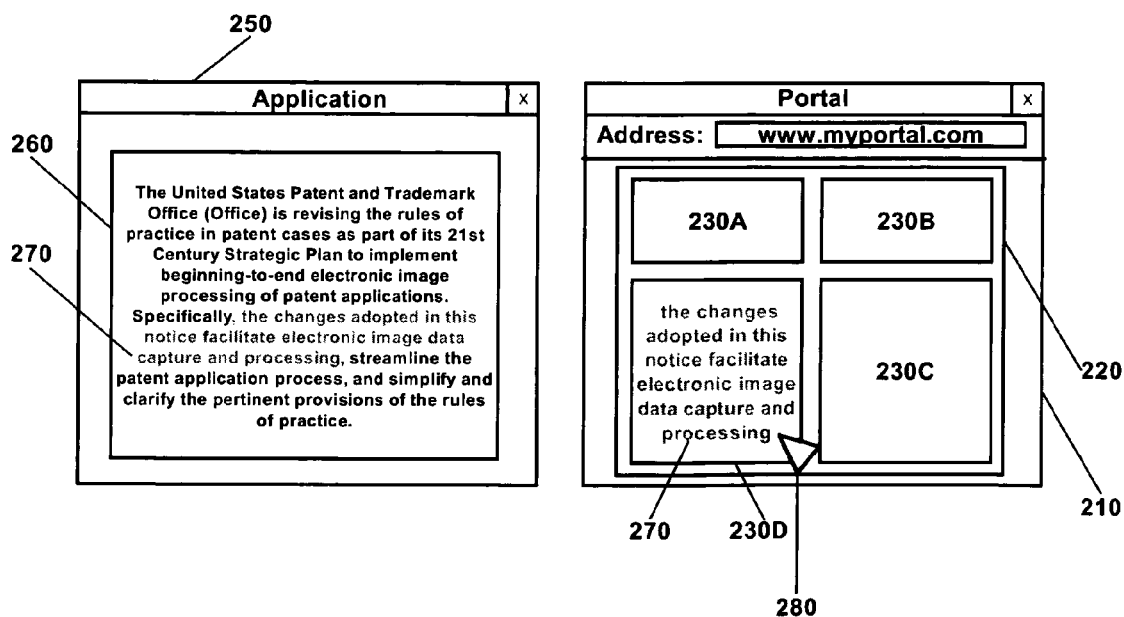

In more particular illustration, FIGS. 2A and 2B, taken together, are a pictorial illustration of an exemplary portal data processing system configured for provisioning a portlet viewer for viewing drag-and-drop content in a portal page. As shown in FIG. 2A, a selection 270 of content 260 within an application 250 which is external to a portal page 220 rendered in a client 210, for instance a content browser, can be selected for copying into a designated space 240 of the portal page 220 that is not already occupied by an instance of a portlet 230A, 230B, 230C. For example, the selection 270 can be dragged and dropped into the designated space 240 through the operation of a pointing device 280, or the selection 270 can be cut and pasted into the designated space 240.

As shown in FIG. 2B, upon detecting either a drop event or a paste event for a drag and drop operation or a cut and paste operation, respectively, the content type for the content 260 can be determined. Based upon the determination, a particular portlet 230D can be identified for use in rendering the selection 270 in the portal page 220. Subsequently, the identified portlet 230D can be provisioned into the designated space 240 in the portal page 220 and the selection 270 can be rendered within the portlet 230D.

Significantly, the selection 270 can be rendered within the portlet 230D without requiring an end user to engage in a complex configuration process and the mere act of dragging and dropping the selection 270 into the designated space can suffice for causing the provisioning of the portlet 230D and the display of the selection 270 in the portlet 230D. In the case where more than one interpretation of data type is possible, the user can be presented with the choices and select the appropriate type. Alternatively, the provisioning component can base the selection upon weighted priorities of the available data types. In either event, reconfiguration of the provisioning choices can allow changes in the original provisioning when necessary.

Figure 3:
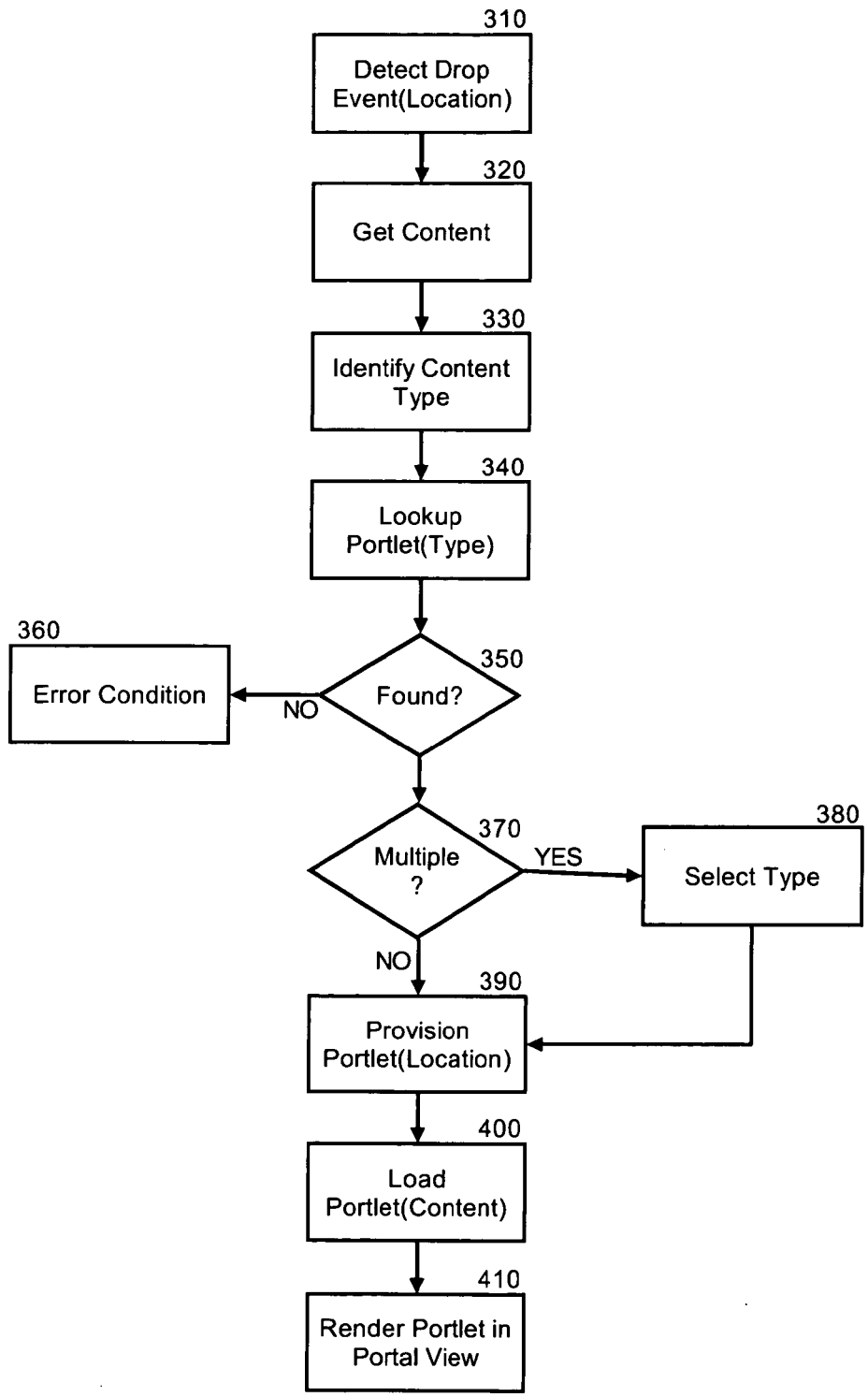

Turning now to FIG. 3, a flow chart is shown which illustrates a process for provisioning a portlet viewer for viewing drag-and-drop content in a portal page. Beginning in block 310, a drop event can be detected for a location in a portal page. In block 320, content associated with the drop event can be obtained and a content type for the content can be determined in block 330. In block 340, a portlet associated with the identified content type can be located. If, in decision block 350, a portlet which is associated with the content type cannot be located, an error condition can arise in block 360.

Otherwise, in decision block 370, if more than one content type is located for drag-and-drop event, in block 380 where more than one interpretation of data type is possible, one of the data types can be selected. For instance the user can be presented with the choices and select the appropriate type. Alternatively, the selection can be based upon weighted priorities of the available data types. In any event, in block 390, the located portlet can be provisioned for the location and in block 400 the content can be loaded into the portlet for viewing. Finally, in block 410, the portlet can be rendered in the portal page.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer hardware system configured to provision a portlet viewer for viewing drag-and-drop content in a portal page, comprising:
at least one processor, wherein the at least one processor is configured to initiate and/or perform:
    determining a content type for content selected externally to the portal page subsequent to rendering the portal page;
    locating a portlet viewer associated with the determined content type;
    provisioning the located portlet viewer in the portal page; and
    rendering the provisioned portlet viewer in the portal page with the content.

2. The system of claim 1, wherein
the determining includes detecting a drop event for a drag and drop operation for the content.

3. The system of claim 2, further comprising
identifying a designated portion of the portal page for receiving the content.

4. The system of claim 3, wherein
the located portlet viewer is provisioned in the designated portion of the portal page.

5. The system of claim 1, wherein
the determining includes
    locating multiple content types for the content,
    selecting, from the multiple content types, a content type based upon one of
        a user selection of the content type and
        an automated selection of the content type based upon weighted priorities of the multiple content types.

6. The system of claim 1, wherein
the determining includes detecting a paste event for a cut and paste operation for the content.

7. The system of claim 6, further comprising
identifying a designated portion of the portal page for receiving the content.

8. The system of claim 7, wherein
the located portlet viewer is provisioned in the designated portion of the portal page.

9. The system of claim 1, wherein
the provisioning includes:
    identifying an existing instance of the located portlet viewer in the portal page; and
    configuring the existing instance of the located portlet viewer to receive the content.

10. A computer program product, comprising:
a computer usable storage device having stored therein computer usable program code for provisioning a portlet viewer for viewing drag-and-drop content in a portal page,
the computer usable program code, which when executed by a computer hardware system, causes the computer hardware system to perform:
    determining a content type for content selected externally to the portal page subsequent to rendering the portal page;
    locating a portlet viewer associated with the determined content type;
    provisioning the located portlet viewer in the portal page; and
    rendering the provisioned portlet viewer in the portal page with the content, wherein
the computer usable storage device does not consist of a transitory, propagating signal.

11. The computer program product of claim 10, wherein
the determining includes detecting a drop event for a drag and drop operation for the content.

12. The computer program product of claim 11, wherein the computer usable program code further causes the computer hardware system to perform
   identifying a designated portion of the portal page for receiving the content.

13. The computer program product of claim 12, wherein the located portlet viewer is provisioned in the designated portion of the portal page.

14. The computer program product of claim 10, wherein the determining includes
   locating multiple content types for the content,
   selecting, from the multiple content types, a content type based upon one of
      a user selection of the content type and
      an automated selection of the content type based upon weighted priorities of the multiple content types.

15. The computer program product of claim 10, wherein the determining includes detecting a paste event for a cut and paste operation for the content.

16. The computer program product of claim 15, wherein the computer usable program code further causes the computer hardware system to perform
   identifying a designated portion of the portal page for receiving the content.

17. The computer program product of claim 16, wherein the located portlet viewer is provisioned in the designated portion of the portal page.

18. The computer program product of claim 10, wherein the provisioning includes:
   identifying an existing instance of the located portlet viewer in the portal page; and
   configuring the existing instance of the located portlet viewer to receive the content.

* * * * *